US009615231B2

(12) United States Patent
Thiele et al.

(10) Patent No.: US 9,615,231 B2
(45) Date of Patent: Apr. 4, 2017

(54) CONFIGURING USER INTERFACE (UI) BASED ON CONTEXT

(71) Applicant: SONY CORPORATION, Tokyo (JP)

(72) Inventors: David George Thiele, San Diego, CA (US); Marvin DeMerchant, San Diego, CA (US); Steven Friedlander, San Diego, CA (US)

(73) Assignee: Sony Corporation, Tokyo (JP)

( * ) Notice: Subject to any disclaimer, the term of this patent is extended or adjusted under 35 U.S.C. 154(b) by 65 days.

(21) Appl. No.: 13/909,227

(22) Filed: Jun. 4, 2013

(65) Prior Publication Data

US 2014/0359456 A1 Dec. 4, 2014

(51) Int. Cl.
*G06F 3/048* (2013.01)
*H04W 4/18* (2009.01)
*H04W 4/00* (2009.01)
*H04W 4/02* (2009.01)
*H04W 4/04* (2009.01)
*G06F 3/0481* (2013.01)

(52) U.S. Cl.
CPC ............ *H04W 4/18* (2013.01); *H04W 4/001* (2013.01); *H04W 4/027* (2013.01); *H04W 4/046* (2013.01); *G06F 3/0481* (2013.01); *H04W 4/028* (2013.01)

(58) Field of Classification Search
CPC ......... G06F 3/0481; G06F 9/4443; G06F 8/38
USPC ................................................ 715/762, 765
See application file for complete search history.

(56) References Cited

U.S. PATENT DOCUMENTS

| 8,422,994 | B2 | 4/2013 | Rhoads et al. | |
|---|---|---|---|---|
| 2008/0005679 | A1 | 1/2008 | Rimas-Ribikauskas et al. | |
| 2010/0011304 | A1* | 1/2010 | van Os | 715/762 |
| 2010/0138151 | A1* | 6/2010 | Jang et al. | 701/201 |
| 2010/0146444 | A1 | 6/2010 | Wang et al. | |
| 2011/0072492 | A1* | 3/2011 | Mohler et al. | 715/765 |
| 2011/0092227 | A1* | 4/2011 | Phukan | 455/456.3 |
| 2012/0001843 | A1* | 1/2012 | Gravino | 345/156 |
| 2012/0101724 | A1* | 4/2012 | Ranford | 701/439 |
| 2012/0329441 | A1 | 12/2012 | Tseng | |
| 2013/0303143 | A1* | 11/2013 | Schrader et al. | 455/418 |
| 2013/0311920 | A1* | 11/2013 | Koo et al. | 715/765 |

FOREIGN PATENT DOCUMENTS

| JP | 2010-078535 | 4/2010 |
|---|---|---|
| JP | 2010-236994 | 10/2010 |
| KR | 1020090025260 | 3/2009 |
| WO | 2008002385 A1 | 1/2008 |

OTHER PUBLICATIONS

Jussi Maaniitty, "Intelligent Mobile User Interface", University of Tampere, School of Information Sciences Interactive Technology M.Sc. thesis, http://tutkielmat.uta.fi/pdf.gradu05494.pdf; Dec. 2011.

Daivd Clegg, "Drive time with the HTC One X", Telecom Tech, http://www.geekzone.co.nz/TelecomTech/8128; Jun. 8, 2012.

* cited by examiner

*Primary Examiner* — Haoshian Shih
(74) *Attorney, Agent, or Firm* — John L. Rogitz

(57) ABSTRACT

A mobile apparatus determines whether it is disposed in a vehicle and, based on a determining that it is in the vehicle, automatically presents a first user interface (UI) that is simplified and/or easier to manipulate while driving relative to a second UI that would otherwise be presented.

24 Claims, 8 Drawing Sheets

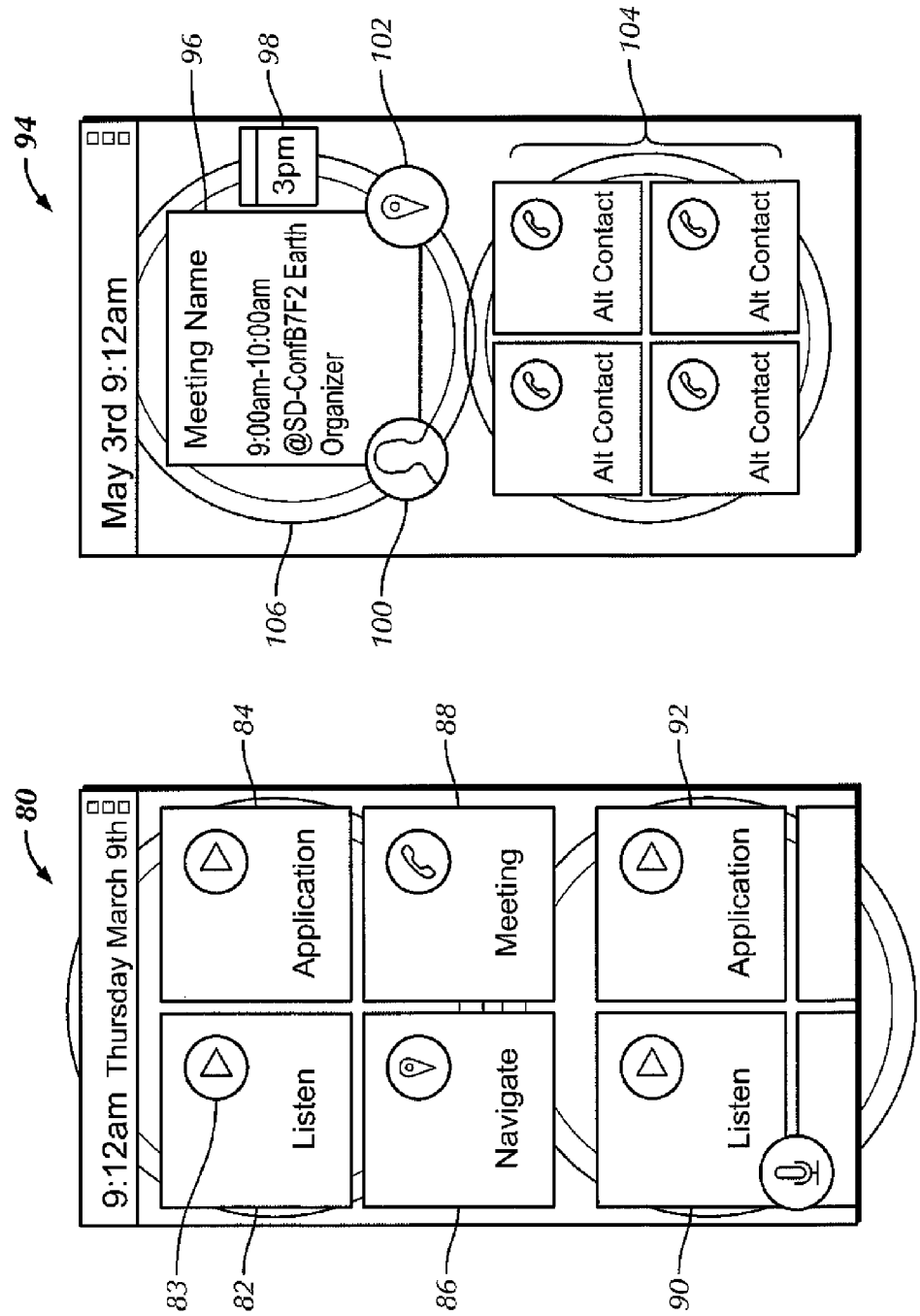

CONFIGURING USER INTERFACE (UI) BASED ON CONTEXT

FIELD OF THE INVENTION

The present application relates generally to configuring a UI based on the context of what a user is doing.

BACKGROUND OF THE INVENTION

With the increased prevalence of mobile devices such as smart phones and tablet computers comes the desirability to use them in particular contexts, such as while driving a vehicle or riding as a passenger in one. However, present principles recognize that current user interfaces that are presentable on such mobile devices to undertake certain functions that may be useful while driving are often difficult and indeed distracting to invoke and manipulate (e.g., owing to their complexity and/or their "cluttered" appearance) while driving.

SUMMARY OF THE INVENTION

Accordingly, the present application provides systems, apparatuses, and methods for presenting, e.g., useful mobile device applications/application icons, notifications and/or other mobile device functions to a user in an easily and quickly viewable format. The present application also recognizes the desirability of automating this presentation rather than having to manually switch back and forth between at least one user interface when not driving a vehicle and at least one while driving a vehicle, though present principles nonetheless recognize that such manual switching may still be desirable in certain contexts.

Accordingly, in one embodiment an apparatus includes a computer readable storage medium that is not a carrier wave and that is accessible to a client processor of a client device and bearing instructions which when executed by the client processor configure the processor to execute logic to execute a method that includes, based on a determination that the client processor is in a vehicle, automatically presenting on a display a user interface (UI) in a first configuration for allowing selection of one of plural applications represented on the UI. Based on a determination that the client processor is not in a vehicle, the instructions cause the processor to automatically present on the display the UI in a second configuration for allowing selection of one of plural applications represented on the UI, the second configuration being different from the first configuration. In some implementations the display may be a client device display, and the client device may include the client processor.

Furthermore, in some embodiments, the plural applications may be represented on the UI by selectable tiles such that the first configuration may present relatively fewer tiles than the second configuration and/or present tiles in at least one larger dimension relative to tiles presented in the second configuration. Moreover, if desired the first and second configurations may differ from each other based on the particular applications represented on the UI.

Also in some embodiments, the UI of the first configuration may be automatically presented on the display based on a determination not only that the client processor is in the vehicle but also that the vehicle is in gear.

In another aspect, a method includes determining whether a client device is disposed in a vehicle and, based on a determination that the client device is disposed in a vehicle, automatically presenting a first user interface (UI) on a display of the client device including relatively less information than a second UI presentable on the display where the second UI is presentable on the display based on a determination that the client device is not disposed in a vehicle.

In yet another aspect, an apparatus includes at least one computer readable storage medium that is not a carrier wave and that is accessible to a client processor and bears instructions which when executed by the client processor configure the processor to execute logic to execute a method that includes determining whether a user activity trigger satisfies a test, where the user activity trigger is motion of a client device associated with the client processor as represented by a signal input to the client processor and/or use of the client device to execute a predetermined application. Responsive to a determination that the user activity trigger satisfies the test, a first output is presented on the client device, whereas responsive to a determination that the user activity trigger does not satisfy the test, a second output is presented on the client device. It is to be understood that the second output is different from the first output.

The details of the present invention, both as to its structure and operation, can best be understood in reference to the accompanying drawings, in which like reference numerals refer to like parts, and in which:

BRIEF DESCRIPTION OF THE DRAWINGS

FIGS. 3-7 contrast examples of UIs optimized for manipulation while driving and "normal" UIs;

DETAILED DESCRIPTION OF THE PREFERRED EMBODIMENT

Figure 1:
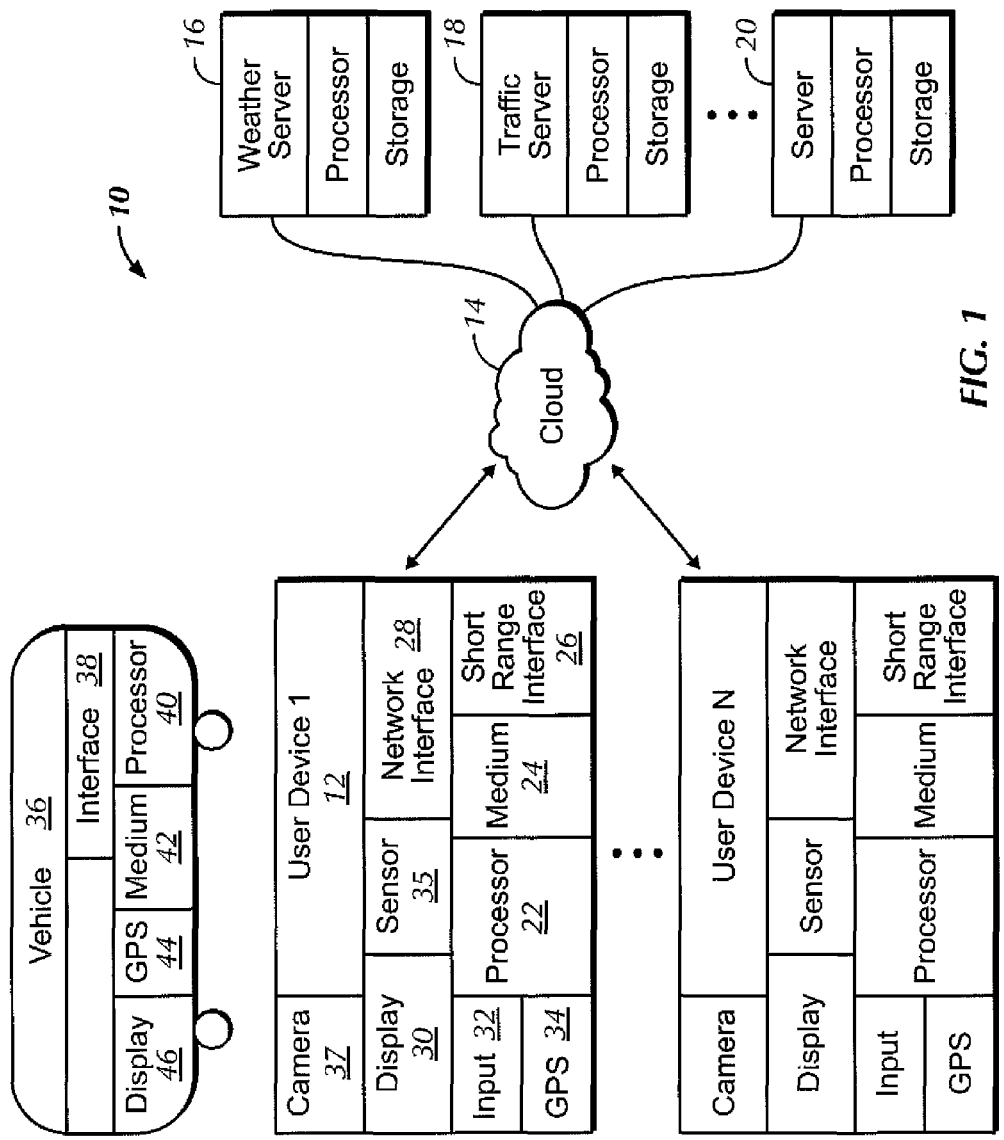
FIG. 1 is a block diagram of an example system according to present principles.

Disclosed are methods, apparatus, and systems for computer based user information. A system herein may include server and client components, connected over a network such that data may be exchanged between the client and server components. The client components may include one or more computing devices. These may include personal computers, laptops, tablet computers, and other mobile devices including smart phones. These client devices may operate with a variety of operating environments. For example, some of the client computers may be running Microsoft Windows® operating system. Other client devices may be running one or more derivatives of the Unix operating system, or operating systems produced by Apple® Computer, such as the IOS® operating system, or the Android® operating system, produced by Google®. While examples of client device configurations are provided, these are only examples and are not meant to be limiting. These operating environments may also include one or more browsing programs, such as Microsoft Internet Explorer®, Firefox, Google Chrome®, or one of the other many browser programs known in the art. The browsing programs on the client devices may be used to access web applications hosted by the server components discussed below.

Server components may include one or more computer servers executing instructions that configure the servers to receive and transmit data over the network. For example, in some implementations, the client and server components may be connected over the Internet. In other implementations, the client and server components may be connected over a local intranet, such as an intranet within a school or a school district. In other implementations a virtual private network may be implemented between the client components and the server components. This virtual private network may then also be implemented over the Internet or an intranet.

The data produced by the servers may be received by the client devices discussed above. The client devices may also generate network data that is received by the servers. The server components may also include load balancers, firewalls, caches, and proxies, and other network infrastructure known in the art for implementing a reliable and secure web site infrastructure. One or more server components may form an apparatus that implement methods of providing a secure community to one or more members. The methods may be implemented by software instructions executing on processors included in the server components. These methods may utilize one or more of the user interface examples provided below in the appendix.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as the AMD® Athlon® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. The description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Pert Python or Ruby. These are examples only and not intended to be limiting.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a, computer-readable medium. Computer-readable media include both computer storage media and communication media including any medium that facilitates transfer of a computer program from one place to another. However, a computer readable storage medium is not a carrier wave, and may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.) It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting.

Referring initially to FIG. 1, a system 10 includes at least one and in the example shown "N" user or client devices 12 communicating via a computer cloud 14 such as the Internet with one or more server computers. In the example shown, a weather server 16, a traffic server 18, and in general one or more servers 20 communicate with the client device 12 through the cloud.

Among the non-limiting and example components a client device 12 may incorporate, a processor 22 accesses a computer readable storage medium 24 that contains instructions which when executed by the processor configure the processor to undertake principles disclosed below. The client device 12 may communicate with other client devices using a wireless short range communication interface 26 such as but not limited to a Bluetooth transceiver controlled by the processor 22. Also, the client device 12 may communicate with the cloud 14 using a wireless network interface 28 such as but not limited to one or more of a WiFi transceiver, wireless modem, wireless telephony transceiver, etc. controlled by the processor 22. Wired interfaces 26, 28 are also contemplated.

The client device typically includes a visual display 30 such as a liquid crystal display (LCD) or light emitting diode (LED) display or other type of display controlled by the processor 22 to present demanded images. The display 30 may be a touch screen display. In addition, one or more input devices 32 may be provided for inputting user commands to the processor 22. Example input devices include keypads and keyboards, point-and-click devices, a microphone inputting voice commands to a voice recognition engine executed by the processor 22, etc. A position sensor 34 may input signals to the processor 22 representing a location of the client device 12. While FIG. 1 assumes that the position receiver 34 is a global positioning satellite (GPS) receiver, other position sensors may be used in addition or in lieu of a GPS receiver. For example, a motion sensor 35 such as an accelerometer, gyroscope, magnetic sensor, and the like may be used to input position information to the processor 22. Location information may also be derived from WiFi information, e.g., the location of the client device may be inferred to be the location of a WiFi hotspot in which the device is communicating. Also, a camera 37 may provide image signals to the processor 22.

FIG. 1 also shows that a person carrying the client device 12 may decide to enter a vehicle 36. The vehicle 36 may include a communication interface 38 controlled by a vehicle processor 40 accessing a computer readable storage medium 42. The interface 38 may be configured to communicate with one of the interfaces of the client device 12 and may be a Bluetooth transceiver. The vehicle 36 may include an onboard GPS receiver 44 or other position receiver sending signals to the processor 40 representing the location of the vehicle 36. The vehicle processor 40 may control a visual display 46 in the vehicle to, e.g., present an electronic map thereon and other user interfaces. Other client devices may be transported by their users into other vehicles and establish communication with the processors of the other vehicles.

Figure 2:
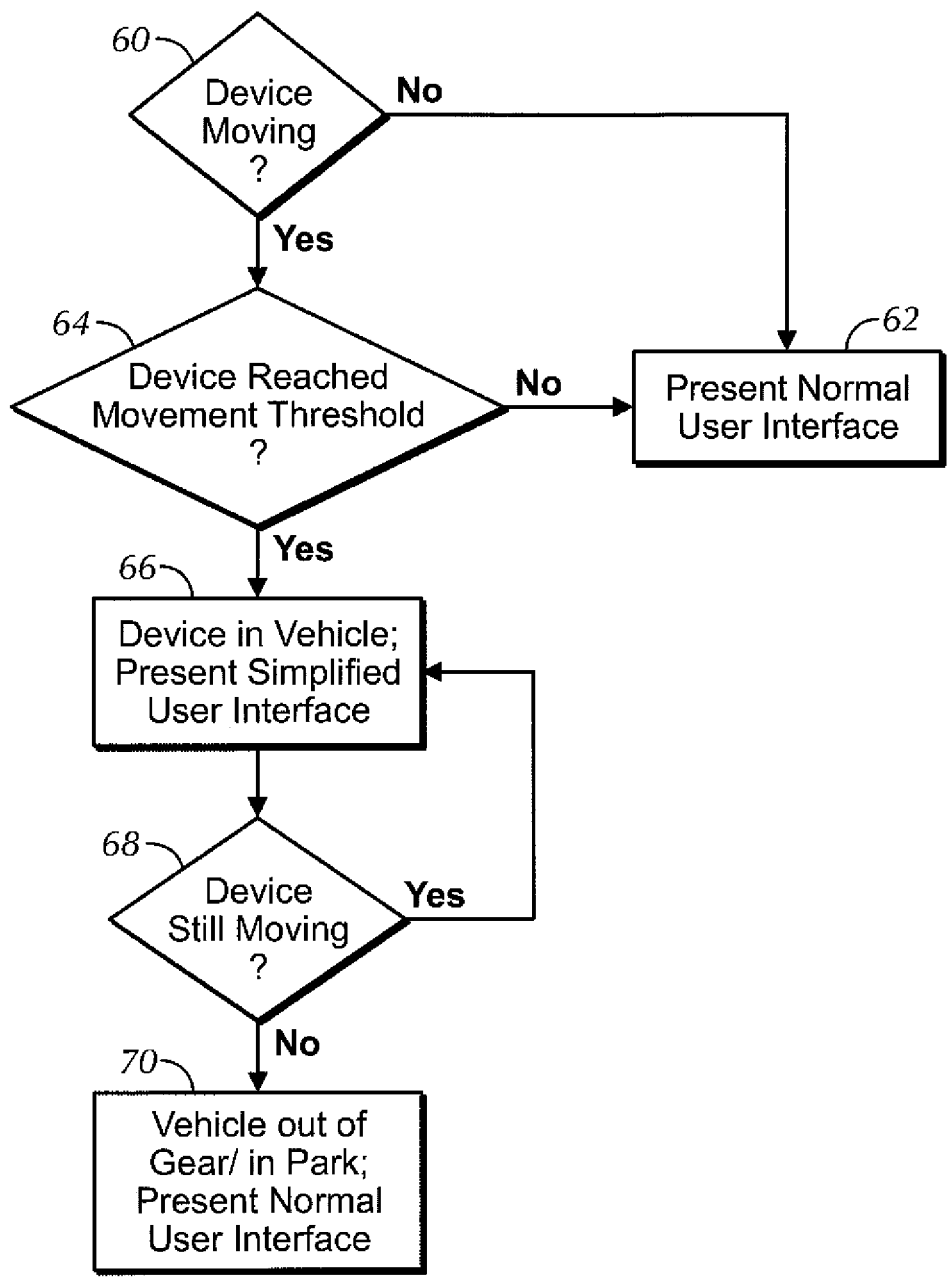
FIG. 2 is an exemplary flow chart of logic for determining whether to present a "driving" user interface (UI) on a client device when the client device is disposed in a vehicle.
Figure 3:
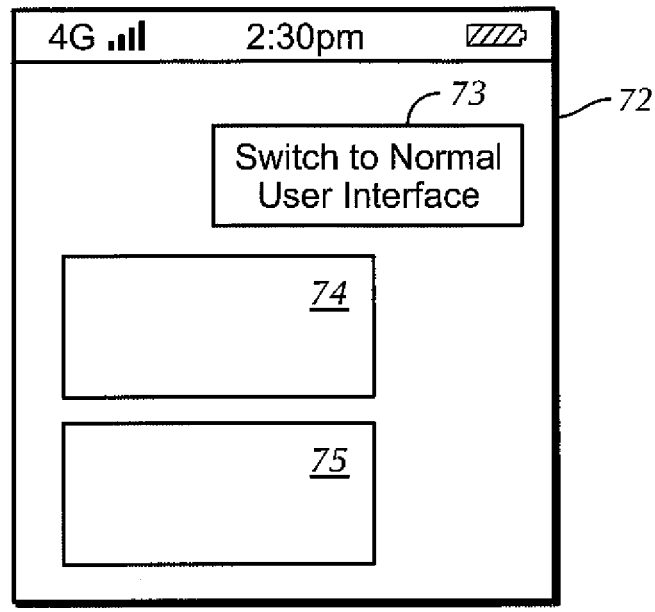

Now in reference to FIG. 2, exemplary logic for determining a user interface (UI) to present on a client (e.g., mobile) device such as the device 12 described above when the client device is disposed in a vehicle is shown, it being understood that the present logic may be executed by a processor associated with the client device. The logic begins at decision diamond 60 where the logic determines whether the device is moving. If the logic determines that the device is not moving, the logic may end (e.g., take no action) or alternatively may proceed to block 62 where a UI may be presented in a "standard," default, and/or "normal" configuration. The terms "standard," default, and "normal" in reference to UIs are used herein is for illustrative purposes only and those terms are not intended to be limiting. Thus, such terms are meant to convey that e.g., a "normal" or default UI is merely a UI presentable on the client device other than a particular one presented while in a vehicle when a person is driving that is configured to be more easily deciphered, read, and/or manipulated by a driver of a vehicle while driving in accordance with present principles.

Regardless, reverting back to decision diamond 60, if an affirmative determination is instead made at this point in the logic, the exemplary logic of FIG. 2 moves to decision diamond 64 from diamond 60. At decision diamond 64, the logic determines whether the device's movement has reached a threshold (e.g., speed, velocity, or distance traveled threshold). Accordingly, it may be appreciated that the logic at diamond 64 can, e.g., distinguish between whether a user of the device is merely walking with a device (in which case a "normal" UI may be presented) or whether based on the threshold the user is in a moving vehicle. If a negative determination is made, the logic moves to block 62 described above to present a "normal" UI. However, should an affirmative determination be made at diamond 64, the logic instead moves to block 66 where the logic presents a UI more optimized for manipulation and viewing while driving (referred to herein as a "driving" UT) than the "normal" UI presented at, e.g., block 62.

Continuing in reference to FIG. 2, after block 66 the logic moves to decision diamond 68 where the logic makes a subsequent determination (e.g., every few seconds, every minute, based on input from an accelerometer of GPS of the client device such as a change in motion of the client device) as to whether the device is still moving (and, e.g., even whether it is still moving at or above the threshold, if desired). If an affirmative determination is made at diamond 68, the logic reverts back to block 66 by continuing to present the UI more optimized for manipulation while driving and may again proceed to diamond 68 as set forth above (e.g., after a predetermined period of time). If a negative determination is made, the logic instead moves to block 70 where the logic presents a "normal" UI.

In addition, though not forming part of the exemplary logic discussed above, it is to be understood that other "triggers" besides a motion threshold may be used in accordance with present principles to cause a driving UI to be presented. For example, invocation of a particular icon representing an application can constitute a trigger to thereby cause a driving UI to be presented. As an example, should a traffic application icon be invoked, this can cause the processor to determine that a driving UI should be presented.

Figure 4:
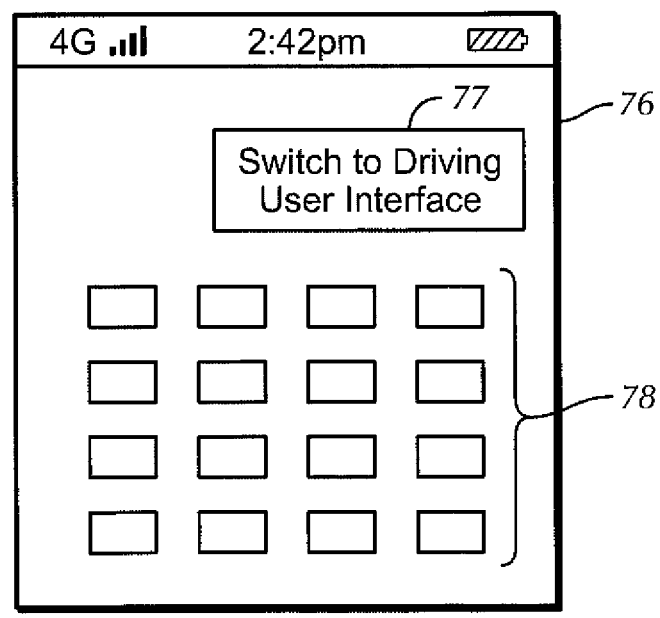

Examples of UIs optimized for manipulation while driving in contrast to "normal" UIs for presentation, viewing, and/or manipulation while not driving are shown in FIGS. 3-6. Beginning first with FIG. 3, an exemplary UI 72 optimized for manipulation while driving is shown as being presented on an exemplary client device such as a smart phone. The UI 72 thus includes only two selectable icons/tiles 74 and 75 representing applications that may be invoked upon selection of the respective icon, and optionally may also include a selectable icon 73 to switch to a "normal" UI from the driving UI. In contrast, FIG. 4 shows an exemplary UI 76 having a four by four grid of icons 78 that, e.g., could be a default and/or stock configuration for an out-of-the-box client device, or simply one useful for accessing any one of a number of applications when the client device is not disposed in a vehicle. Also, the UI 76 may optionally include a selectable icon 77 to switch to a driving UI if desired. Comparing FIGS. 3 and 4, it may be appreciated that a UI such as the UI 72 is optimized for manipulation while driving in at least one aspect, such as presenting fewer icons than the UI 76 so that it is easier to distinguish among them and/or presenting one or more icons in larger dimensions (e.g., height and width, or even three dimensions if the icons are presentable in three dimensional form).

Two more exemplary driving UIs in accordance with present principles are shown in FIGS. 5 and 6. The exemplary UI 80 of FIG. 5 is understood to be a "home" driving UI that may be presented after the client device determines that it is disposed in a vehicle, and furthermore may be presented merely upon such a determination in accordance with present principles or subsequent to input from a user, e.g., as described in reference to FIG. 23 below. Regardless, the UI 80 includes large, easily selectable icons even when the motion of a moving vehicle may make it difficult (e.g., dips and bumps). Icons to present on the home driving UI 80 may be determined by a user such that the same icons are presented each time, or alternatively the UI 80 may dynamically change based on, e.g., predictions of which applications may be useful depending on one or more parameters as described herein.

Either way, it may be appreciated that the exemplary UI 80 of FIG. 5 shows six icons and portions of two more to which a user may scroll. Of the six icons that are shown, they include an icon 82 related to a particular piece of content to which to listen when selected, a "more applications" icon 84 selectable to present other applications than those shown on the UI 80, a navigation icon 86, and a calendar/meeting icon 88. It is to be understood that each of the icons 82-88 are associated with respective applications represented by the respective icon, where the application or a specific function thereof may be invoked by selecting the icon from the UI 80.

Thus, an exemplary focused driving UI 94 is shown in FIG. 6, the UI 94 understood to be presented in response to selection of an icon from the home driving UI 80 of FIG. 5.

The "focused" UI 94 thus pertains to a specific function, notification, or other information related to the icon that was selected from the UI 80 and focused on in the UI 94. In the case of FIG. 6, a calendar/meeting notification is shown in response to the calendar/meeting icon 88 being selected from the UI 80. It may be appreciated from the UI 94 that a notification 96 is presented thereon and contains information related to an upcoming meeting for the user of the device presenting the UI 94. Thus, the notification 96 includes the name of the meeting, the scheduled start and end time of the meeting, the location of the meeting, and the organizer of the meeting. It may be further appreciated from the UI 94 that still other selector elements/icons may he presented thereon, such at a "3 p.m." selector element 98 next to the notification 96 that denotes the next upcoming meeting after the one reflected by the notification 96. Thus, the selector element 98 may be selected to cause a notification similar to the notification 96 to he presented with information similar to that shown in the notification 96 but for the "3 p.m." meeting.

Furthermore, a contact selector element 100 is also shown on the UI 94 and is presented in such a way (e.g., partially overlapping the notification 94) so that it is easily discernable that the contact represented by the element 100 is indeed associated with the meeting (e.g., another meeting participant), and is easily selectable while driving. The element 100 is therefore selectable to cause, e.g., a telephone or text messaging application to launch or to otherwise be used to contact the person represented by the element 100. Likewise, a navigation selector element 102 may also be presented on the UI 94 in such a way (e.g., partially overlapping the notification 94) so that it is easily discernable that selection of the element 102 may cause navigation assistance to be presented (e.g., directions to the meeting associated with the notification 96), and indeed the element 102 is presented in such a way that it is easily selectable while driving. Also note that a background image 106 may also be presented to make it even easier for a user discern while driving that all of the icons/selector elements and notifications that are overlapping or encompassed by the image 106 are in some respect associated with the same subject matter (in this case, the meeting to which the notification 96 centrally disposed on top of the image 106 pertains). For completeness, also note that alternate contacts may be represented by plural respective icons 104, where those contacts may be but are not necessarily associated with the upcoming meeting with which the notification 96 is directed.

Momentarily reverting back to FIG. 5, it is to be understood that in some embodiments, the icons may themselves include icons therein or on a portion thereof. Such icons may be useful for, e.g., directly controlling a sensory output of the client device. Thus, for example, selection of the listen icon 82 at the portion 83 may cause the associated audio content to be presented through speakers in response to a single touch on the portion 83, whereas selection of the listen icon 82 on a portion other than the portion 83 may instead cause another driving UI to be presented with additional information regarding the audio content represented by the icon 82. Furthermore, for completeness note that still other icons can be presented on a home driving UI. Types of applications that may be presented by icons for presentation on a home driving UI include, but are not limited to, people and user contacts, events, audio and/or video content, locations, still other application windows and UIs, and "to do list" items.

Figure 7:
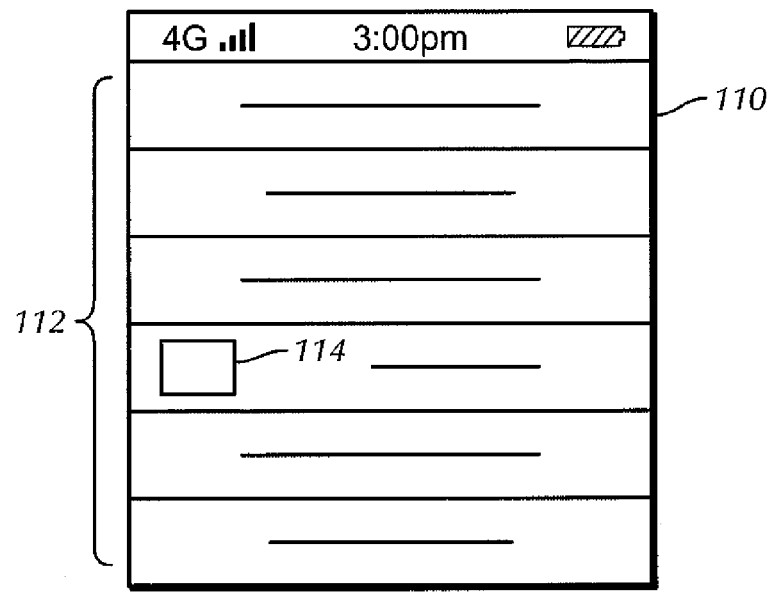

Yet another exemplary UI optimized for manipulation and viewing while driving is shown in FIG. 7. A UI 110 is presented on a client device while the client device is moving (e.g., while the device's user is driving with the device disposed within the vehicle being driven). Rather than the selectable tile/icon formats described above, the UI 110 of FIG. 7 shows a more list-like presentation of optionally selectable items/entries 112. Thus, at least one of the list items 112 may be selectable in that an item that is selectable may be invoked by touching any portion of the item as presented on the touch screen to, e.g., launch an application or execute a function associated with it. Also note that one or more of the items 112 in the list may itself contain a selectable icon such as the icon 114 shown, and even further in such cases the item itself that presents the icon 114 may or may not be selectable as described above notwithstanding the icon 114 being selectable. In any case, it may be appreciated that any combination of selectable items and icons, and indeed items that are not selectable, may be presented on a single list such as the one of FIG. 7.

Regardless of whether the items 112 or particular icons or other aspects/information respectively contained therein (e.g., selectable text) are selectable or not, it is to be further understood each item may present its information, e.g., in bold face type, with a solid underline, with a dotted underline, with highlighting, in text colors other than black, in italics, in any number of font types such as e.g. Times New Roman or Cambria, and/or in relatively large font (e.g., as compared to a "normal" UI when the device is not in a moving vehicle) that is easy to glance at for information while driving or otherwise quickly and easily draws the attention of a user so as to, e.g., not consume an undue amount of the viewer's time deciphering information while also driving and thus creating a safety hazard. Furthermore, as may be appreciated from FIG. 7, each item 112 spans the width of the UI 110 although some or all of the items may be less wide than the UI 110 if desired, and indeed the items may vary in other dimensions as well (such as height). Moreover, note that the items 112 may provide information such as, e.g., that described above regarding the notifications and applications described herein.

Figure 8:
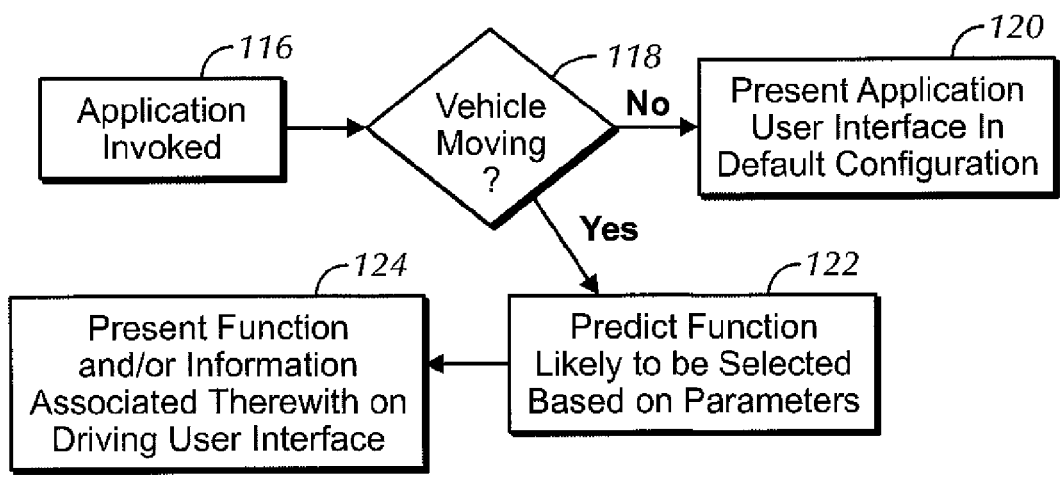
FIG. 8 is an exemplary flow chart of logic for predicting a particular function or aspect of an application to view or use while driving.
Figure 9:
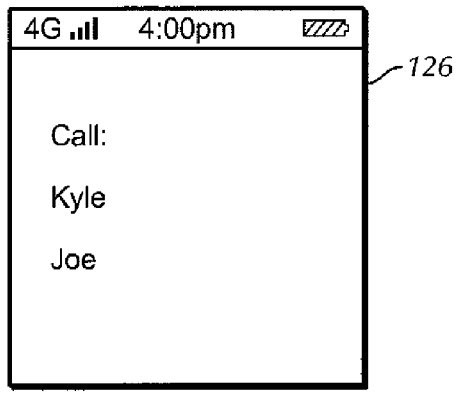
FIGS. 9-20 contrast examples of various driving UIs and "normal" UN for particular applications.

Moving on to FIG. 8, it shows exemplary logic to be undertaken by a client device processor to execute an application on the client device and predict a particular function or aspect of the application which a user may desire to view or use while driving. Thus, FIG. 8 begins at block 116 where an application such as those described herein is invoked (e.g., an email application, a social networking application, a telephone application, etc.). Once the application is invoked at block 116, the logic moves to decision diamond 118 where the logic determines whether the vehicle is moving in accordance with present principles. If the logic determines at diamond 118 that the vehicle is not moving, the logic moves to block 120 where the logic presents a "normal" or "default" UI. Thus, for instance, should a Facebook application be invoked, the application typically opens by default to the Facebook "News Feed," which may be the case when presenting a "normal" UI in accordance with present principles. As yet another example, a "normal" default UI to present when a client device is not in a vehicle and/or is in the vehicle but the vehicle is e.g., in park or otherwise out of gear (e.g., the clutch is pushed in on a manual transmission vehicle) is for an invoked email application to initially present the email account's inbox.

Regardless, should the logic instead determine at diamond 118 that the vehicle in which the client device executing the logic of FIG. 8 is disposed is moving, the logic instead proceeds to block 122 where the logic executing the application predicts a particular function of the application, and then presents the function at block 124 based on one or more parameters. As an example, one such parameter could be past invocation of a particular function of the application in a previous instance when the client device was disposed within a vehicle being driven. Such past invocations can be prioritized based on the number of past selections as well so that, e.g., a first function invoked more frequently and/or recently, and/or more times, than a second function is presented first or higher up on a driving UI, and/or is even further visually distinguished using one or more of the ways described above (e.g., the item selected more frequently and/or more times is presented in both bold faced and larger font, whereas the second item is presented only in larger font).

Examples of other parameters are the current location of the device or predicted destination, the time of day, time of month, time of year, etc., recent activities, recent selections of the same or even different icons and associated applications, driving conditions and even appropriateness and ability of a user to use a particular function when accounting for driving conditions (e.g., sitting in traffic may not be an optimal time to type an email but may nonetheless be a time for quickly glancing at the text of an email sent to the user).

Accordingly, should the logic move from diamond 118 to block 122, an example of a driving UI that may be presented using an email application may be an email composition screen rather than an inbox screen that would otherwise be presented as a "normal" UI. As another example, should a telephone application be invoked, a driving UI that may be presented would include an icon for a particular one of the user's contacts that is selectable using, e.g., a single touch to "speed dial" the contact, where that contact was predicted by the application to be the person the user is driving to meet based on, e.g., the direction of movement of the vehicle and/or electronic calendar entries accessible to the device and/or phone application.

Figure 10:
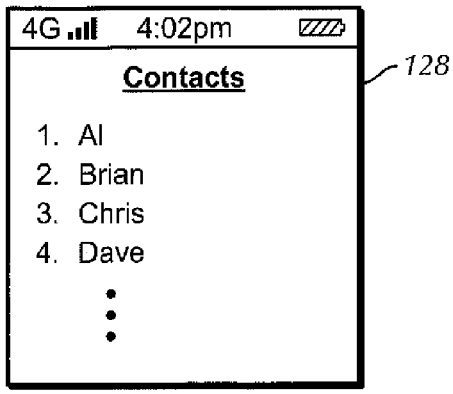

Reference is now made to FIGS. 9-20, which contrast various exemplary driving UIs and "normal" UIs for particular applications in accordance with present principles. Thus, it is to be understood that the driving UIs described below may have been invoked while the client device is disposed in a vehicle that is being driven, whereas the "normal" UI may have been invoked while the device was not disposed in a vehicle and/or was disposed in a vehicle that was not moving or not moving at or above a threshold. Beginning with FIG. 9, a driving UI 126 for a telephone application is shown. Rather than presenting a user's full contact list or a key pad to dial a telephone number (which may be examples of "normal" UIs), the driving UI 126 presents only two selectable contacts in relatively large form for one-touch calling. In contrast, the UI 128 of FIG. 10 shows a "normal" UI for a telephone application that lists a more numerous set of contacts (e.g., in alphabetical order).

Figure 11:
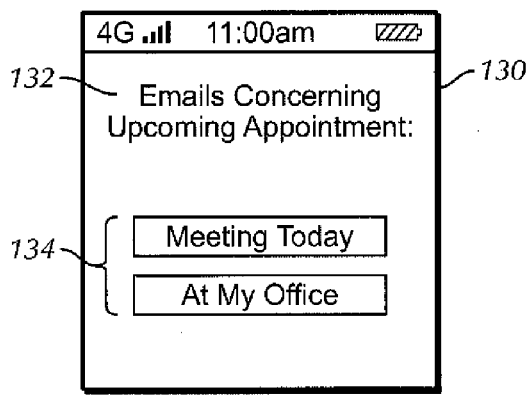
Figure 12:
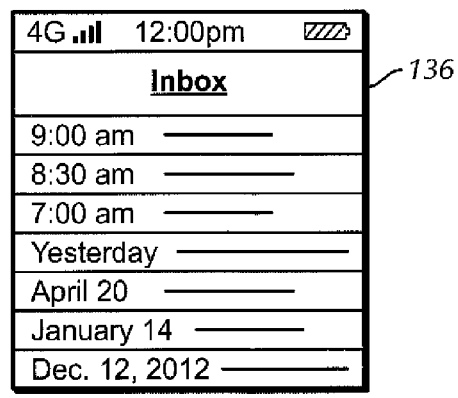

Moving on to FIG. 11, it shows a driving UI 130 for an email application. An indicator 132 is shown which indicates that the emails presented on the UI 130 are email entries 134 particularly pertaining to the user's immediately upcoming appointments that are selectable to cause the full text of the respective emails to be presented. In contrast, a "normal" email UI 136 is shown in FIG. 12. It shows all emails in reverse chronological order in a user's inbox at the time of invocation of the email application.

Figure 13:
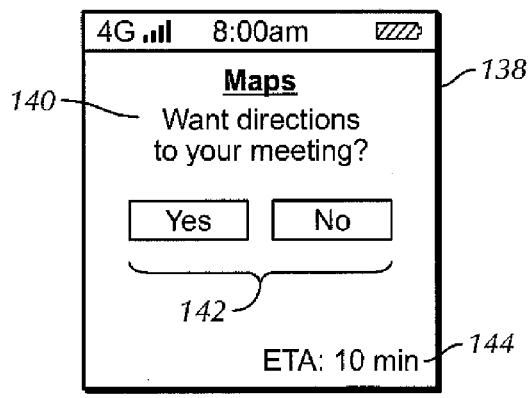
Figure 14:
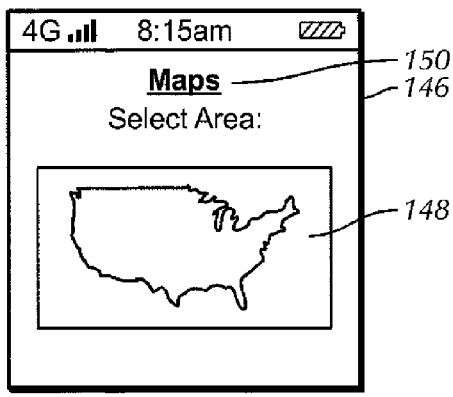

Now in reference to FIG. 13, it shows a driving UI 138 for a map application. Thus, the map application presenting the UI 138 has determined, e.g. based merely on invocation of an icon associated with it and without any further user action, that the device is in a moving vehicle and thus automatically presents the prompt 140 asking the device's user whether the user wishes to have directions to an upcoming meeting presented on the device. The UI 138 thus includes two selectors 142 for the user to respond affirmatively or negatively, it being understood that directions may be automatically presented in response to selection of the yes selector without any further input from the user. Furthermore, note that the UI 138 also includes an estimated time of arrival (ETA) indicator 144 including an estimated time until arrival at the destination to which the application determines the user is traveling based on a prediction in accordance with present. In contrast, FIG. 14 shows a "normal" UI 146 for a maps application that includes an image 148 of the United States and a prompt 150 requesting the user select a particular area for a more detailed map.

Figure 15:
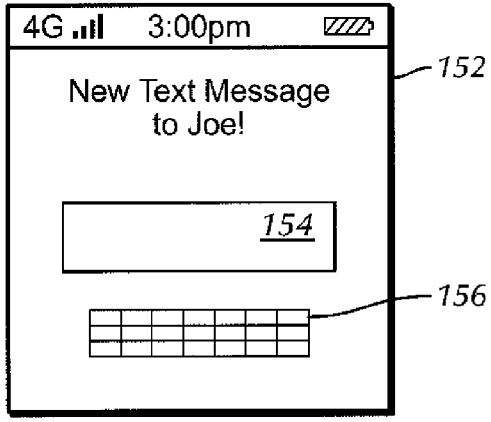
Figure 16:
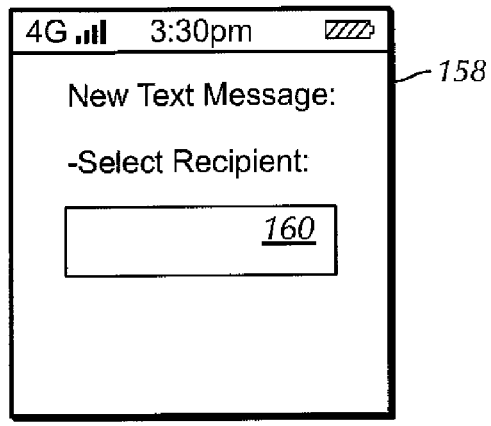

Now describing FIG. 15, a driving UT 152 for a text messaging application is shown. The driving UI 152 is directed to sending a text message to the user's contact "Joe," whom is predicted to be the person the user of the client device is driving to meet in accordance with present principles. Thus, the UI 152 includes an input area 154 and a "soft" keyboard 156 for entering text to the area 154. In contrast, a normal UI 158 is shown in FIG. 16. Being invoked without the device being in a vehicle, in this instance the text messaging application presents the UI 158 with an area 160 to input a recipient's name (e.g., again using a "soft" keyboard) to begin the process of sending a text message.

Figure 17:
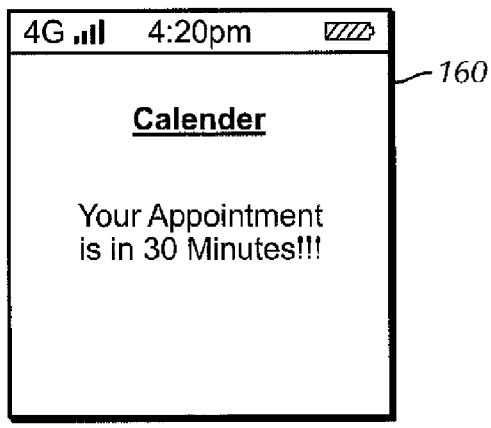
Figure 18:
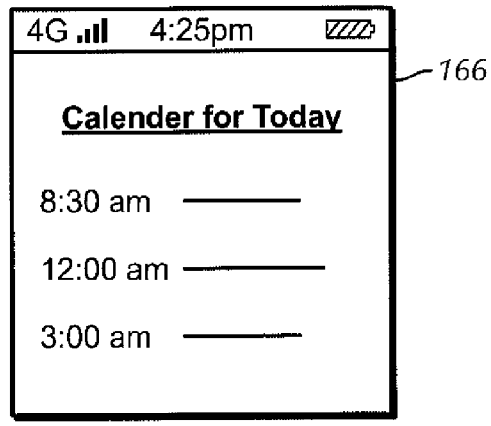

Turning now to FIG. 17, it shows a driving UI 162 for a calendar application. The driving UI 162 includes a textual notification reminding the user that the user's appointment is in thirty minutes. In contrast, the "normal" UI 166 of FIG. 18 shows a list of upcoming appointments for the user in chronological order.

Figure 19:
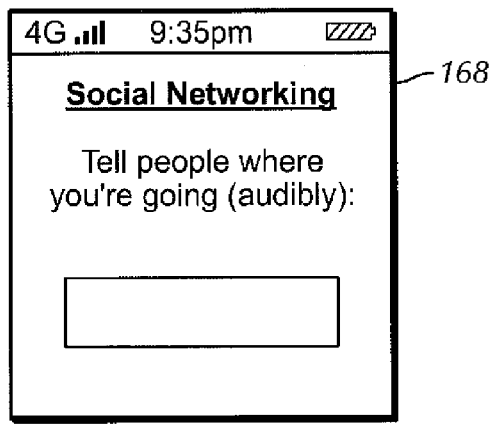
Figure 20:
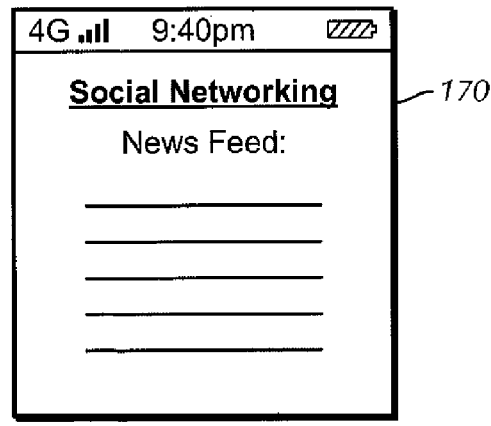

Continuing the detailed description in reference to FIG. 19, a driving UI 168 is shown for a social networking application. The UI 168 presents a prompt and provides a text input box for a user to post to the social networking service to inform the user's social networking "friends" where the user is driving. In contrast, the "normal" UI 170 of FIG. 20 shows a "news feed" or "update feed" associated with the user's social networking account.

It may now be appreciated that various particular functions of an application may be presented and manipulated by a user when driving a vehicle as opposed to when the application is invoked in, e.g., a living room setting. However, present principles recognize that particular functions may not only be predicted, but indeed the applications themselves that a user is likely to invoke may also be predicted. Logic for predicting applications likely to be invoked while driving is therefore shown in FIG. 21.

Figure 21:
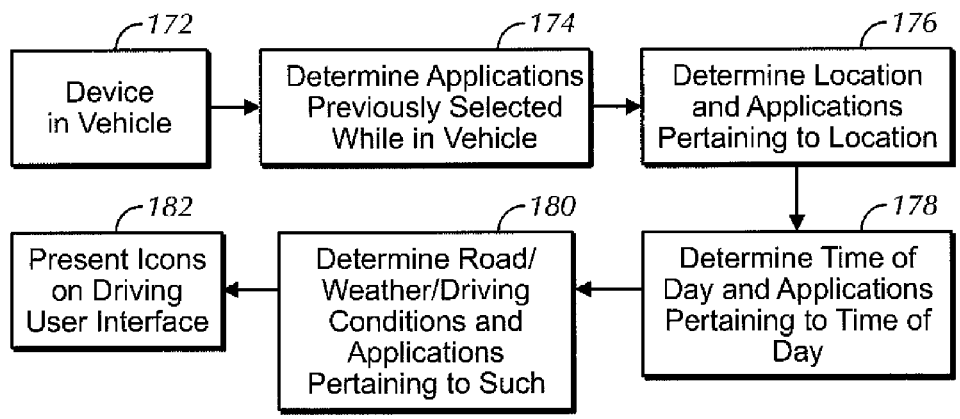
FIG. 21 is an exemplary flow chart of logic for predicting and presenting applications likely to be invoked while driving.

Thus, FIG. 21 begins at block 172 with the logic determining that the client device is disposed within a moving vehicle in accordance with present principles. The logic then moves to block 174 where the logic determines, accesses data in a data base, and/or otherwise ascertains applications previously selected on the device while the device was disposed in a vehicle, e.g., at times previous to execution of the present logic. The logic then moves to block 176 where the logic determines the location of the device, and hence the location of the vehicle, and determines any applications that may be particularly useful to the user while at or around that location (e.g., if the logic determines that the user is near a shopping center, a shopping application may be determined by the logic to be of use to the user). From block 176 the logic moves to block 178 where the logic determines the time of day and then determines any applications that may be particularly useful at that time of day (e.g., if the logic determines that the time of day is somewhere in the morning hours, a Starbucks application may be determined by the logic to be of use to determine the location of the nearest store to purchase a cup of coffee). The logic then moves to block 180 where the logic determines road, weather, and/or driving conditions at and/or around the location of the device and thus determines applications that may be of particular use given those conditions (e.g., a traffic application may be determined to be of use if there is an accident ahead on the road being driven).

The exemplary logic may then conclude at block 182, where the logic presents a driving UI that includes one or more icons predicted by the logic to be of relevance and/or useful to the user of the device when considering certain parameters such as those described above. Before moving on to the description of the next figure, it is to be understood that not all of the steps of, e.g., blocks 174 through 180 need be undertaken much less in the order described above, and that, e.g., any combination or only a single one of them may be undertaken.

Figure 22:
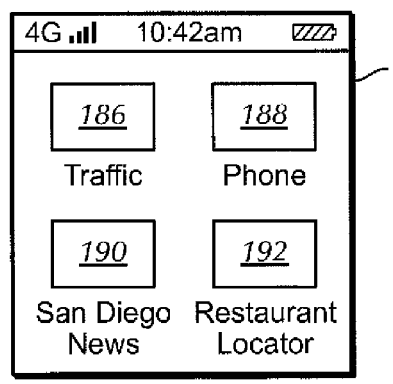
FIG. 22 is an exemplary driving UI showing icons representing applications predicted as likely to be invoked.

Now in reference to FIG. 22, an exemplary driving UI 184 presenting icons selectable to invoke underlying applications associated with each respective icon are shown. It is to therefore be understood that the UI 184 may have been presented, e.g., at least in part using the logic of FIG. 21. As may be appreciated from FIG. 22, only four icons are shown on the UI 184, though more or less may be presented. The UI 184 includes a traffic application icon 186, a telephone application icon 188, a local news application icon 190, and a restaurant locator application icon 192, all of which are understood to have been predicted to be of use to the user based on various parameters such as those described above.

Figure 23:
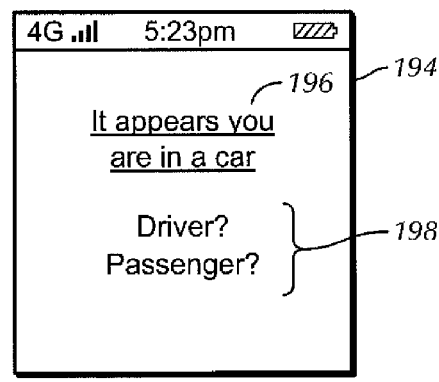
FIG. 23 is an exemplary UI presented when a client device determines the device is in a vehicle and asking the user of the device whether to present a driving UI or "normal" UI.

Continuing the detailed description in reference to FIG. 23, an exemplary UI 194 is shown that may be presented when a client device (e.g., initially) determines it is in a vehicle in accordance with present principles, but where the client device may be associated with or be manipulated by a user who is not driving the vehicle. For instance, a client device user who is a passenger in a vehicle may not necessarily desire to use a driving UI when riding in the back seat of a car and may instead wish to access a "normal" UI. Thus, the UI 194 includes a prompt 196 with two selector elements 198, the prompt indicating the user appears to be in a vehicle and requesting the user provide input regarding whether the user is the driver of the vehicle or a passenger. It may be appreciated that the UI 194 includes relatively larger text and in this respect may itself constitute a driving UI so that a user that is driving the vehicle may easily read it and select the selector for "driver" to subsequently present another driver UI, such as the UI 184 of FIG. 22. Nonetheless, should the user be a passenger, it may be further appreciated that the UI 194 may be manipulated to subsequently present a "normal" UI such as any of the exemplary ones described above.

Thus, it may now be appreciated that position sensors such as a GPS receiver and/or accelerometer or any of the other exemplary position sensors described above may be used in accordance with present principles so that a client device's processor may determine that the device is in a vehicle and that, e.g., the vehicle is moving, to then present a simplified UI that is easily manipulable and discernable to a user while driving (e.g., a simplified list or grid). Moreover, the simplified UI may dynamically change based on certain factors, applications, contexts, and parameters such as those described herein—e.g., past behavior and device usage, location, frequency of use, recent activities (e.g., the device determines that the user was recently at a professional sporting event and thereafter presents icons related to sports generally, a specific team, upcoming games for that team and/or game location, etc.), weather conditions, traffic conditions, road conditions, time of day, etc. Indeed, the client device is understood to be capable of predicting not just a location toward which the device is moving in a vehicle but even events to be participated in based not just on the user's calendar but also, e.g., information accessible to the device regarding public events in the area to which the device is moving and present applications/icons that may be useful in such a context accordingly. It is to thus be understood that such information, or any other information disclosed herein that is accessible by the client device, is accessible over, e.g., a server such as those described above and/or an Internet database.

Still further, media such as music, audio books, podcasts, and streaming audio may be represented on and manipulable through a driving UI. The applications/icons themselves may vary and be filtered based on the speed at which the vehicle in which the device is disposed is traveling. Such filtering and/or dynamic alteration of the driving UI or presentation of another driving UI may be undertaken based on, e.g., being late to a meeting as opposed to merely traveling to it on time such that icons for contacting another person attending the meeting may be presented to inform them of a late arrival, and even present an estimated time of arrival indicator in the message only when, e.g., the device determines that a late arrival at the meeting is likely. Incoming messages (e.g., text or email) that are flagged as being important can also be recognized by the client device as such and be presented on a driving UI, e.g., in a way to draw the user's attention.

Present principles also recognize many of the following features not specifically described in reference to the figures described above. First, note that a client device may communicate with, e.g., an on-board vehicle computer and vehicle display mounted on the vehicle such that any or all of the UIs described herein may be presented on the vehicle display in addition to or in lieu of presenting them on the display of the client device. Second, in addition to the foregoing features of a driving UI and switching/toggling between a driving UI and a "normal" UI, a client device processor may at certain points also determine that the vehicle in which it is disposed has stopped, e.g., in a parking lot or a red light, and upon such a determination present the "normal" UI for at least part of the time the vehicle is stopped, and possibly the entire duration. At such a time when the vehicle begins to move again (e.g., the signal switches to a green light), the client device processor may then present the driving UI again.

As but another example, the client device may have access to information enabling it to distinguish between the client device traveling on a road or traveling on, e.g., train tracks, by aircraft, by boat, etc. such that the client device processor may determine that even though the vehicle is traveling, it is not traveling on a public road and therefore the device's user may not be driving and hence, may not necessarily prefer a driving UI be presented on the device. Thus, e.g., should a user be riding in a train, the client device can access information such as map information of train tracks to determine that the device, while moving in a "vehicle" and above a motion threshold as described above, is not in an automobile and that a "normal" UI should be presented rather than a driving UI. Similar principles can be applied to a situation where the user of the client device is a passenger in a city bus or commuter bus based on determinations made by the client device processor accessing information indicating that the vehicle in which the device is disposed is a bus, and hence the user is predicted to not be the driver of the bus and hence a "normal" UI may be more appropriate for presentation than a driving UI.

Still other applications are possible. For instance, a client device processor may have access to information pertaining to state laws (and/or driving laws, regional laws, etc.) and hence present a driving UI, or even a particular presentation or configuration thereof, responsive to determining based on state law information it has accessed that only a certain type of presentation or configuration is legal, and thus present such a presentation or configuration in accordance with the state law in the state in which the device is disposed. In fact, should state law dictate that a screen should be locked only to a driving UI while a person is driving with the device such that a "normal" UI cannot be rendered, the device may have access to such information and lock the driving UT screen and/or any functions thereof such that a "normal" UI is not presented in such circumstances.

Describing yet another example, should a client device determine that it is indeed disposed in a moving vehicle, but the vehicle is nonetheless on non-public land such as a private ranch or parking lot, the device may determine that even though the device is moving in a vehicle, it should nonetheless present a "normal" UI based on, e.g., a user's preference as input to the device.

As a final example, it is to be understood that a client device presenting a driving UI in accordance with present principles may gather information such as voice commands, voice interactions, verbal statements and other natural language from the user, etc., and respond by updating the driving UI based on those statements. Thus, for example, should a conversation between the user and another person be directed toward a particular topic, the client device is capable of gathering and recognizing words spoken and present applications and information on a driving UI predicted to be relevant based on the context of the conversation. For example, if a user verbally asks "Who is attending my meeting?" the device can recognize the question as, e.g., a command to present information and/or an icon on a driving UI regarding who is attending the meeting and even present an icon selectable to render more information about the meeting and/or the meeting organizer, and/or even send an update to each person attending the meeting as they are listed in sequence (e.g., the client device can present an icon selectable a single time that contains words such as "Inform everyone you're going to be late?" that, based on a single manipulation or touch input from a user automatically causes the device processor, without further user input, to send notifications, text messages, emails, and/or social networking posts, etc., informing the other meeting participants that the user of the client device will be late to the meeting, and such a message to others can even include the user's ETA.

While the particular CONFIGURING USER INTERFACE (UI) BASED ON CONTEXT is herein shown and described in detail, it is to be understood that the subject matter which is encompassed by the present invention is limited only by the claims.

What is claimed is:

1. An apparatus comprising:
at least one computer memory that is not a transitory signal and comprising instructions executable by at least one client processor for:
determining whether a user activity trigger satisfies a test;
responsive to a determination that the user activity trigger satisfies the test, present a first output on the client device; and
responsive to a determination that the user activity trigger does not satisfy the test, present a second output on the client device, the second output being different from the first output, wherein the first output includes message entries filtered such that the message entries pertain to immediately upcoming appointments in a calendar data structure.

2. The apparatus of claim 1, wherein the client processor is supported by the client device.

3. The apparatus of claim 1, wherein the activity trigger includes motion shove a threshold.

4. The apparatus of claim 1, wherein the first and second outputs are respective notifications.

5. The apparatus of claim 1, wherein the first, output includes information related to a first application and the second output includes information related to a second application different from the first application.

6. The apparatus of claim 1, wherein the first output includes user contact information for at least a first contact and the second output includes user contact information for at least a second contact.

7. The apparatus of claim 1, wherein the first output is a notification and the second output is invocation of an application.

8. The apparatus of claim 1, wherein the first output is invocation of an application and the second output is a notification.

9. A system comprising:
at least one client processor; and
at least one computer memory that is not a transitory signal and comprising instructions executable by the at least one client processor for:
determining whether a user activity trigger satisfies a test;
responsive to a determination that the user activity trigger satisfies the test, present a first output on the client device; and
responsive to a determination that the user activity trigger does not satisfy the test, present a second output on the client device, the second output being different from the first output, wherein the first output includes message entries filtered such that the message entries pertain to immediately upcoming appointments in a calendar data structure.

10. The system of claim 9, wherein the client processor is supported by the client device.

11. The system of claim 9, wherein the activity trigger includes motion above a threshold.

12. The system of claim 9, wherein the first and second outputs are respective notifications.

13. The system of claim 9, wherein the first output includes information related to a first application and the second output includes information related to a second application different from the first application.

14. The system of claim 9, wherein the first output includes user contact information for at least a first contact and the second output includes user contact information for at least a second contact.

15. The system of claim 9, wherein the first output is a notification and the second output is invocation of an application.

16. The system of claim 9, wherein the first output is invocation of an application and the second output is a notification.

17. A method comprising:
determining whether a user activity trigger satisfies a test;
responsive to a determination that the user activity trigger satisfies the test, present a first output on the client device; and
responsive to a determination that the use activity trigger does not satisfy the test, present a second output on the client device, the second output being different from the first output, wherein the first output includes message entries filtered such that the message entries pertain to immediately upcoming appointments in a calendar data structure.

18. The method of claim 17, wherein the client processor is supported by the client device.

19. The method of claim 17, wherein the activity trigger includes motion above a threshold.

20. The method of claim 17, wherein the first and second outputs are respective notifications.

21. The method of claim 17, wherein the first output includes information related to a first application and the second output includes information related to a second application different from the first application.

22. The method of claim 17, wherein the first output includes user contact information for at least a first contact and the second output includes user contact information for at least a second contact.

23. The method of claim 17, wherein the first output is a notification and the second output is invocation of an application.

24. The method of claim 17, wherein the first output is invocation of an application and the second output is a notification.

* * * * *